United States Patent [19]
Johnson et al.

[11] 3,759,109
[45] *Sept. 18, 1973

[54] MULTI-TIME CONSTANT PNEUMATIC ANALOGUE DECOMPRESSION INSTRUMENTS

[75] Inventors: Lyman A. Johnson; Marcus P. Borom, both of Schenectady, N.Y.

[73] Assignee: General Electric Company, Schenectady, N.Y.

[*] Notice: The portion of the term of the patent subsequent to Jan. 16, 1990, has been disclaimed.

[22] Filed: Sept. 16, 1971

[21] Appl. No.: 181,107

[52] U.S. Cl. .............................. 73/432 R, 235/184
[51] Int. Cl. ............................................. G06g 5/00
[58] Field of Search ................. 73/432 R, 299, 300, 73/395, 396, 406 R, 407, 112; 235/184

[56] References Cited
UNITED STATES PATENTS
3,209,579  10/1965  Roberts ................................ 73/1 R FOREIGN PATENTS OR APPLICATIONS
735,170  5/1966  Canada ................................. 73/432

Primary Examiner—S. Clement Swisher
Attorney—Frank L. Neuhauser et al.

[57] ABSTRACT

A decompression meter to guide a diver in rapidly and safely returning to the surface is described. It includes as key elements a number of separate semipermeable membranes through which a gas diffuses at different rates in simulation of the uptake and release of nitrogen by a plurality of different time-constant tissues of the diver's body during the hyperbaric exposures of his underwater excursion.

8 Claims, 4 Drawing Figures

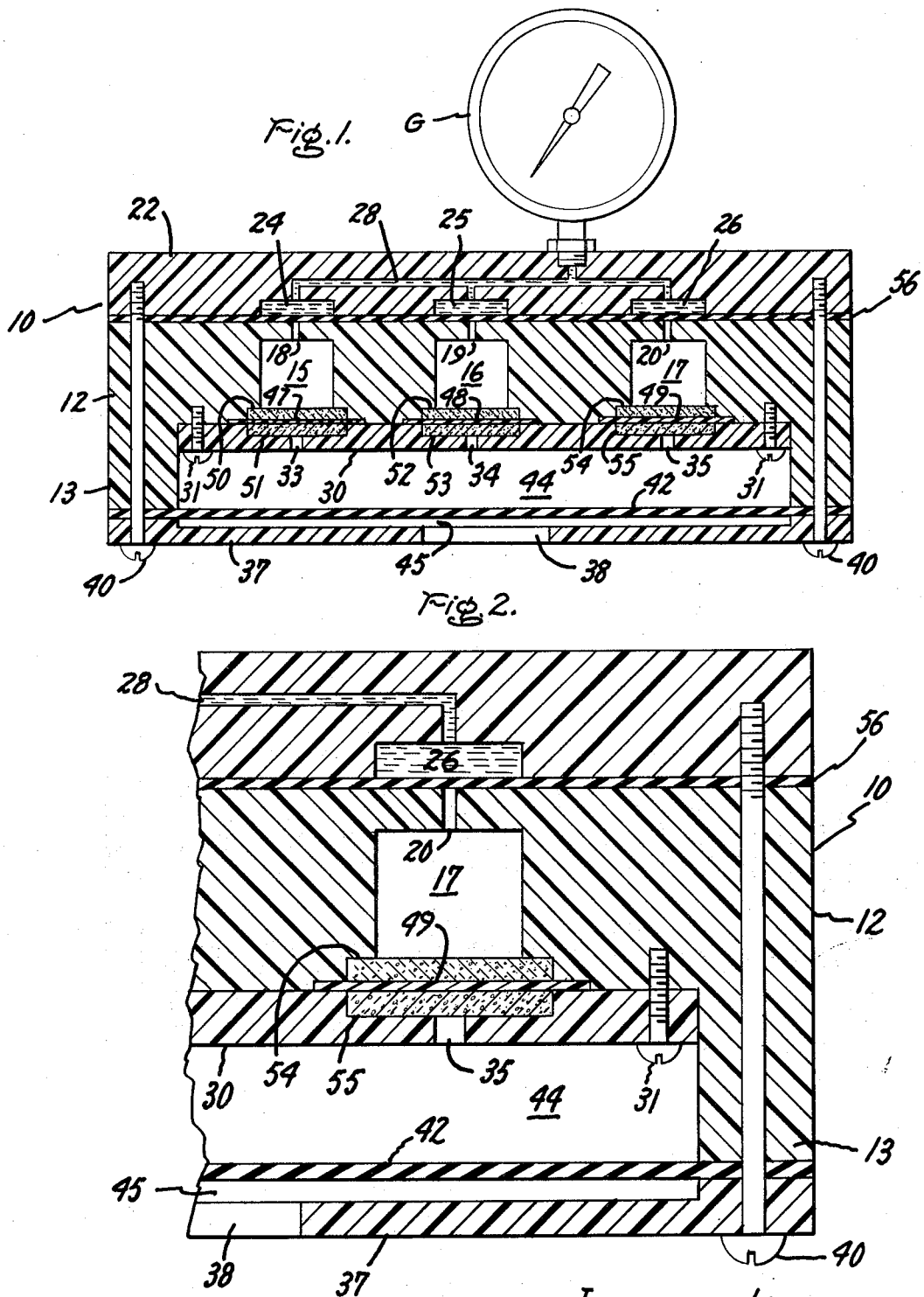

Patented Sept. 18, 1973

Inventors:
Marcus P. Borom,
Lyman A. Johnson,
by
Their Attorney.

MULTI-TIME CONSTANT PNEUMATIC ANALOGUE DECOMPRESSION INSTRUMENTS

The present invention relates generally to the art of computing decompression schedules and is more particularly concerned with novel pneumatic analogue decompression instruments which continuously sense ambient pressures and compute the effect of hyperbaric exposures upon a plurality of different time-constant body tissues, and indicate a minimum-duration safe decompression schedule.

CROSS REFERENCES

This invention is related to those of the following four patent applications assigned to the assignee hereof and filed of even date herewith:

Patent Application Ser. No. 181,048, filed Sept. 16, 1971, entitled, "Pneumatic Analogue Decompression Instrument," in the name of Marcus P. Borom, which discloses and claims the concept of using a permselective membrane to simulate the gas-diffusion characteristics of body tissues as they take up the gas of the breathing mixture and release it as ambient pressure varies.

U.S. Pat. Application Ser. No. 181,106, filed Sept. 16, 1971, entitled, "Miniaturized Automatic Decompression Meters," in the names of Marcus P. Borom and Lyman A. Johnson, which discloses and claims the combination of a time-constant gas chamber and a liquid-filled gauge which enables miniaturization without impairing performance of the instrument.

U.S. Pat. Application Ser. No. 181,099, filed Sept. 16, 1971, entitled "Single Gauge Multi-Time Constant and Multi-Tissue Ratio Automatic Decompression Instruments," in the names of Marcus P. Borom and Lyman A. Johnson, which discloses and claims the concept of using biasing means to represent the tissue ratio parameter and the concept of connecting several different time-constant chambers in automatic switching relation with a single gauge so that the gauge always indicates the highest pressure prevailing anywhere in the system.

U.S. Pat. Application Ser. No. 181,096, filed Sept. 16, 1971, entitled, "Combined Depth Gauge and Penumatic Analogue Decompression Instrument," in the names of Marcus P. Borom and Lyman A. Johnson, which discloses and claims the concept of using a porous body both to provide the volume of the time-constant gas chamber and to provide support for the semipermeable membrane and the gauge-sealing diaphragm. An additional novel feature is the coordinated depth gauge formed in the transparent cover of the instrument for read-out on the decompression meter dial.

BACKGROUND OF THE INVENTION

The major hazard faced by both commerical and sport divers is decompression sickness which results from the release of dissolved gases from the body tissues as discrete bubbles when the abmient pressure is reduced too rapidly. As the ambient pressure is increased during a dive, the body tissues begin to absorb more gas from the breathing mixture to equilibrate with this pressure change. The rate of such equilibration varies from tissue to tissue, but not significantly from person to person, nor between compression and decompression phases, and is vitally important only in the course of return from hyperbaric exposure. Also, the tissues can withstand, to varying degrees, an internal over-pressure (i.e., supersaturation) during decompression without nucleating gas bubbles. This is referred to as a tissue ratio and is given by the expression Tissue ratio = Safe maximum tissue pressure/ambient pressure with the pressures given on an absolute scale. The rate of descent, therefore, is a matter of the diver's choice while the rate of ascent is limited by a combination of the tissue ratio and the rate at which the dissolved gases enter the bloodstream in the dissolved state and are removed from the body through the lungs.

Boycott, Damant and Haldane ["The Prevention of Compressed-Air Illness", J. Hygiene, 8, 342–443 (1908)] proposed that the body tissues can be considered to be gas diffusion chambers arranged in a parallel circuit with each chamber having a characteristic tissue half-time and tissue ratio.

On the basis of their model, Boycott, et al. proposed a radical departure from the conventional continuous decompression schedules which became known as "stage" decompression. Today, their model forms the basis for the modern decompression schedules as set forth in the Standard Navy Decompression Tables. These Tables have been computed using tissue half-times of 20, 40, 80 and 120 minutes and tissue ratios from 2.5/1 to 1.8/1. These Tables are designed for fixed mission dives, that is, dives to a predetermined depth for a predetermined time. Consequently, they are not suitable for the majority of commerical and sport dives since they prescribe a longer-than-necessary decompression schedule as the alternative to hazarding an estimate compensating for depth excursions during a dive. Recognizing the need for a better answer to the problem, the prior art provided decompression meters having input, computation and read-out components of various kinds. In these devices, however, computation is accomplished by the resistive flow of a gas through an orifice or a porous medium which follows the mathematics of Poiseuille flow and not diffusion through a membrane. These devices, then, share the characteristic of inability to compute minimum-duration safe decompression schedules according to the Boycott, et al model. Thus, because of Poiseuille flow, tissue gas uptake and release actions are not computed according to the expressions used in developing the accepted decompression tables. The use of a diffusion membrane provides the precise analogue to these expressions.

SUMMARY OF THE INVENTION

The decompression meters of this invention are versatile instruments which can automatically compute minimum-duration safe decompression schedules for dives of widely varying times and depths in which different decompression-rate limitations are imposed by tissues of different time constants. In general, such an instrument includes several separate permselective membrane elements having different gas-diffusion time constants, each being selected to simulate or match a particular human body tissue in that respect. Each of these gas-diffusion membrane elements is operatively connected to an ambient-pressure gas chamber to measure separately and continuously the uptake and release of gas by the particular time-constant body tissue to which it is matched. These membranes are also individually operatively associated with indicator or gauge means to enable read-out of the amount of gas diffused through them in one direction or the other in terms of a safe decompression schedule. A submersible housing supports all these components and encloses most of them.

In accordance with this invention, the instrument may be self-contained or it may be provided in form for coupling into a diver's breathing gas supply line or other source of suitable ambient-pressure gas. In the former case, the ambient-pressure chamber is of variable volume in proportion to the water pressure to which the instrument is subjected, while in the latter instances, the gas pressure in the ambient-pressure chamber is regulated by the equalizer valve of the breathing gas system or in other convenient manner.

DESCRIPTION OF THE DRAWINGS

The novel features of this invention are illustrated in the drawings accompanying and forming a part of this specification, in which:

FIG. 1 is a vertical sectional view of a decompression instrument embodying this invention in preferred form;

FIG. 2 is an enlarged, fragmentary, vertical sectional view of part of the FIG. 1 instrument showing details of structure of the ambient pressure-sensing means, the gas-diffusion membrane means and gauge means;

DETAILED DESCRIPTION OF THE INVENTION

Figure 3:
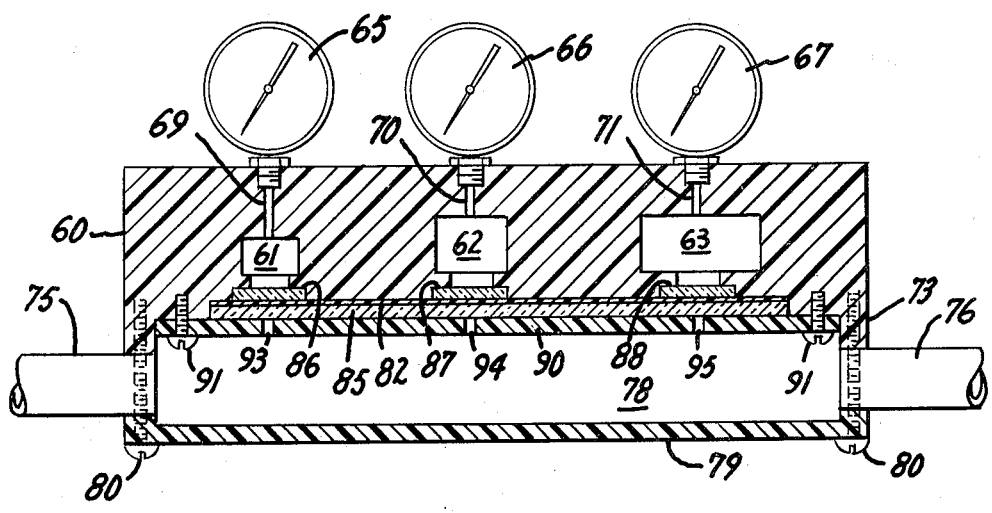
FIG. 3 is a view like that of FIG. 1 of another decompression instrument of this invention having a separate gauge for each gas-diffusion membrane.

The self-contained instrument of FIG. 1 comprises an immersible four-piece body 10 suitably of transparent plastic material such as polymethylmethacrylate, and a bourdon tube gauge G mounted thereon. A time-constant gas pressure chamber block 12 is the central and largest part of body 10 and is formed with a peripheral flange 13 and three cylindrical recesses 15, 16 and 17 of identical volumes, which serve as time-constant pressure chambers. Apertures 18, 19 and 20 communicate with chambers 15, 16 and 17, respectively, and open through the top surface of block 12, as shown in FIGS. 1 and 2.

A manifold block 22 is situated above block 12 and provided with three liquid pressure chambers 24, 25 and 26 in the form of relatively short cylindrical recesses in the lower side of block 22 in register with apertures 18, 19 and 20, respectively. A branched bore or passageway 28 in block 22 connects chambers 24, 25 and 26 to gauge G and thus serves as a manifold. These chambers and the manifold, as well as gauge G, are filled with a suitable liquid, such as a hydraulic brake fluid so that a change in the effective volume of any of the liquid pressure chambers is indicated on the gauge dial.

An inner retaining member 30 in the form of a polymethylmethacrylate plate is mounted on the lower side of block 12 within flange 13, being attached by a plurality of bolts 31. Member 30 is provided with three recesses in its upper surface in register with recesses 15, 16 and 17. Apertures 33, 34 and 35 opening through the lower side of member 30 each communicate with a separate recess so that gas may flow through retaining member 30 when the instrument is in use, as will be described.

A cover plate 37 having a central aperture 38 for free flow of water into the instrument is secured around its periphery to flange 13 by bolts 40 which extend through block 12 and into manifold block 22 to hold body 10 fluidtightly together.

A diaphragm 42 of elastomeric material, suitably vulcanized natural rubber, is disposed within body 10 adjacent to cover plate 37 and gripped around its periphery between plate 37 and flange 13 so that the diaphragm divides the space between plates 30 and 37 into an inner chamber 44 serving as an ambient pressure gas chamber, and an outer chamber 45 open to the environment through aperture 38.

A second flexible and resilient diaphragm 56, also suitably of vulcanized natural rubber, is disposed between blocks 12 and 22 where it is held firmly in position by the compressive effect of bolts 40. Diaphragm 56 therefore provides a fluid-tight seal between chambers 24, 25 and 26 and apertures 18, 19 and 20, while at the same time being deflectable from the rest position illustrated to displace liquid in the manifold system and gauge G.

Communication between chambers 15, 16 and 17 and ambient pressure gas chamber 44 is also closed to the free flow of gases, but in this case there necessarily is gas on both sides of the closure and the closure is a gas diffusion membrane of the kind described in detail in above-referenced copending application RD-3993 – Borom. Thus, silicone rubber membrane discs 47, 48 and 49 are disposed between time-constant gas chambers 15, 16 and 17 and their respective apertures 33, 34 and 35. Membrane disc 47 is of three-mil thickness, while disc 48 is six mils thick and disc 49 is 9 mils thick. These discs are supported against gas pressure differentials between chamber 44 and the time-constant gas chambers by porous fritted glass discs, membrane disc 47 being disposed between glass discs 50 and 51. Membranes 48 and 49 are likewise supported on both sides by glass discs 52 and 53, and 54 and 55, respectively, all three pairs of glass discs being disposed in opposed recesses in block 12 and plate 30 so that the membrane discs are firmly fixed in position against relative motion while the instrument is in use.

Figure 4:
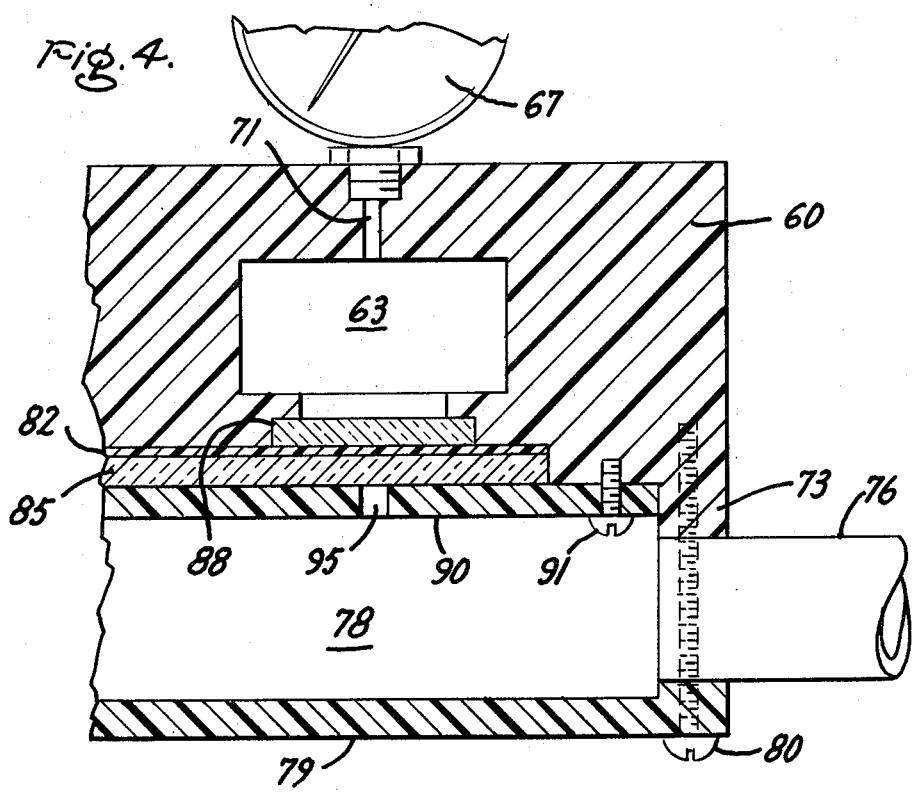
FIG. 4 is an enlarged vertical sectional view of part of the FIG. 3 instrument.

The instrument of FIGS. 3 and 4 is generally similar to that of FIGS. 1 and 2 except that the ambient-pressure gas chamber is provided with conduit means by which it is connectable to the diver's ambient-pressure breathing supply. Also, this is a multi-gauge instrument in which the time-constant gas chambers each communicate directly with a separate gauge and are of different volumes according to the gas absorption characteristics of the tissues which they simulate.

This instrument includes a time-constant gas chamber block 60 in which chambers 61, 62 and 63 are provided. Chamber 62 is of twice the volume of chamber 61, while chamber 63 is three times larger than chamber 61. Bourdon tube gauges 65, 66 and 67 are mounted on block 60 and operatively connected to chambers 61, 62 and 63, respectively, by apertures 69, 70 and 71 so that gas can flow freely between these chambers and their gauges as gas pressure fluctuates in the chambers while the instrument is in use. These chambers are also open to the lower side of block 60 through recesses formed in the block for purposes to be described.

Body 60 has a lower peripheral flange 73 through which hose connections 75 and 76 are made to maintain breathing gas at ambient pressure in gas chamber 78. This chamber is closed by cover 79 secured to block 60 by a number of bolts 80 extending through flange 73.

Diffusive gas flows between chamber 78 and chambers 61, 62 and 63 is the result of the presence of a gas diffusion membrane in the form of a 3-mil thick sheet 82 of silicone rubber which extends across the time-constant chamber array. A porous fritted glass sheet 85 likewise extends across the array and provides support below for membrane 82. Three separate porous fritted glass discs 86, 87 and 88 of identical size similarly provide support for membrane 82 on its upper side in the regions directly below chambers 61, 62 and 63. The portions of block 60 which are located to either side of discs 86, 87 and 88 bear directly upon the top surface of membrane 82 so that it is gas-tightly sealed around these discs. This membrane assembly is retained in position by retainer plate 90 which is secured to block 60 by bolts 91 and has apertures 93, 94 and 95 serving chambers 61, 62 and 63, respectively.

The effective areas of gas diffusion membrane are uniform, being determined in each instance by the area of the surface of a supporting disc in contact with membrane 82. Thus, a variation of this invention would be an instrument differing from that of FIGS. 3 and 4 in that the time-constant gas chambers would be all of the same volume but the effective areas of membrane 82 would be different, that serving chamber 62 being twice that associated with chamber 61 and two-thirds of the third active membrane area.

It will be understood that other membranes than those of silicone rubber described above can be used in these instruments and in some cases such use would be to advantage over silicone rubber membranes where, for example, a breathing gas mixture other than air is employed by the diver. Thus, as disclosed in copending application RD-3993 — Borom, a Teflon plastic membrane would be preferable for use in the usual heliox breathing supply system. Additionally, it will be understood that instead of using membranes as single elements of varying thicknesses, one may laminate membranes which are relatively thin, fastening them into place suitably loosely assembled and without any joining means between them. In any case, the important consideration in respect to the membrane material and the choice between using single or multiple membranes is that the gas-diffusion characteristics of each membrane closely match or simulate the gas uptake and release characteristic of the particular human body tissue of specific concern in respect to the calculation of decompression schedules.

MODE OF OPERATION

When the instrument of FIGS. 1 and 2 is carried through a diving excursion, the volume of chamber 44 is diminished as the water pressure is increased, the ambient water pressure deforming diaphragm 42 and thereby diminishing the volume of chamber 44 and compressing the air or other gas therein initially at atmospheric pressure. This results in diffusion of such air through membranes 47, 48 and 49 at rates directly proportional to the thicknesses of these membrane elements, since the effective membrane areas and the volumes of chambers 15, 16 and 17 are uniform. Assuming for simplicity a prolonged period of substantially constant hyperbaric pressure in chamber 44, the pressure chamber 15 will gradually increase and the pressures in chambers 16 and 17 will also increase but at slower rates because of the greater thicknesses of membranes 48 and 49. Diaphragm 56 will be deformed under the pressure prevailing in chamber 15 displacing liquid in chamber 24 and causing the indicator of gauge G to move proportionately relative to the calibrated dial of the gauge. The pressures in chambers 16 and 17 will at one time or another be the greatest in the time-constant chamber system and consequently will individually register in similar manner on gauge G. For instance, on decompression following a prolonged hyperbaric excursion, chamber 17 will have a higher gas pressure than either of the others which means that the tissue for which chamber 17 and its associated membrane 49 is the analogue is the tissue which contains the greatest proportion of absorbed gas and therefore is the one limiting the rate of decompression at that particular point on the return journey.

The function of the instrument of FIGS. 3 and 4 is similar, but, as indicated above, the time-constant gas chambers are of different sizes while the gas diffusion membrane thickness is uniform, and the gauge means is not manifolded but is gas operated with each time constant and chamber being served by a separate gauge. Consequently, in actual use the pressure will begin to rise first in chamber 61 and then sequentially in chambers 62 and 63. Consequently, gauge 65 will register a positive reading relatively shortly after the diver has entered the water, indicating that his short time-constant tissues have absorbed appreciable amounts of gas as a result of exposure to hyperbaric pressure. Again, on decompression, the diver's progress toward the surface will be guided by first one and then another and finally the third gauge as gas diffuses through the membranes and gas pressures in the time-constant chambers diminishes in simulation of the gas desorption occurring in the corresponding body tissues.

What we claim as new and desire to secure by Letters Patent of the United States is:

1. A decompression instrument which comprises,
   a. a submersible housing;
   b. an ambient pressure gas chamber in the housing;
   c. a plurality of pneumatic analogue computing means in the housing each of which has a time constant different from the others but corresponding to a particular human body tissue and each of which comprises,
      1. an imperforate gas diffusion membrane operatively associated with the ambient pressure gas chamber to measure continuously the uptake and release of gas by a particular time-constant tissue of a diver during hyperbaric exposure; and
   d. indicator means operatively associated with such computing means for visually indicating the appropriate decompression schedule.

2. The instrument of claim 1 in which the pneumatic analogue computing means includes a separate time-constant gas chamber operatively associated with each gas diffusion membrane and in which the indicator means is operatively associated with the separate time-constant gas chambers.

3. The instrument of claim 1 in which the membranes are of silicone rubber.

4. The instrument of claim 1 in which one membrane is of thickness twice that of a second membrane.

5. The instrument of claim 1 in which the indicator means includes a first gauge operatively associated with a first membrane and a second gauge operatively associated with a second membrane.

6. A decompression meter for use on underwater excursions comprising
   a. ambient-pressure gas chamber means;
   b. plural gas-diffusion imperforate membrane means separately operatively associated with the ambient-pressure gas chamber means to measure separately continuously the uptake and release of gas by a diver's different time-constant tissues during hyperbaric exposure,
   said membrane means comprising a first imperforate membrane having a relatively short time constant and a second imperforate membrane having a longer time constant; and,
   c. gauge means operatively associated with the first and second imperforate membranes for visually indicating the appropriate decompression schedule.

7. The meter of claim 6 in which the gauge means includes a first gauge operatively associated with the first imperforate membrane and a second gauge operatively associated with the second imperforate membrane.

8. The meter of claim 6 in which the gauge means comprises a single gauge which is operatively associated with both membranes imperforate.

* * * * *